(No Model.)
J. C. YOUNG & F. C. MARANVILLE.
HITCHING STRAP.
No. 456,210. Patented July 21, 1891.
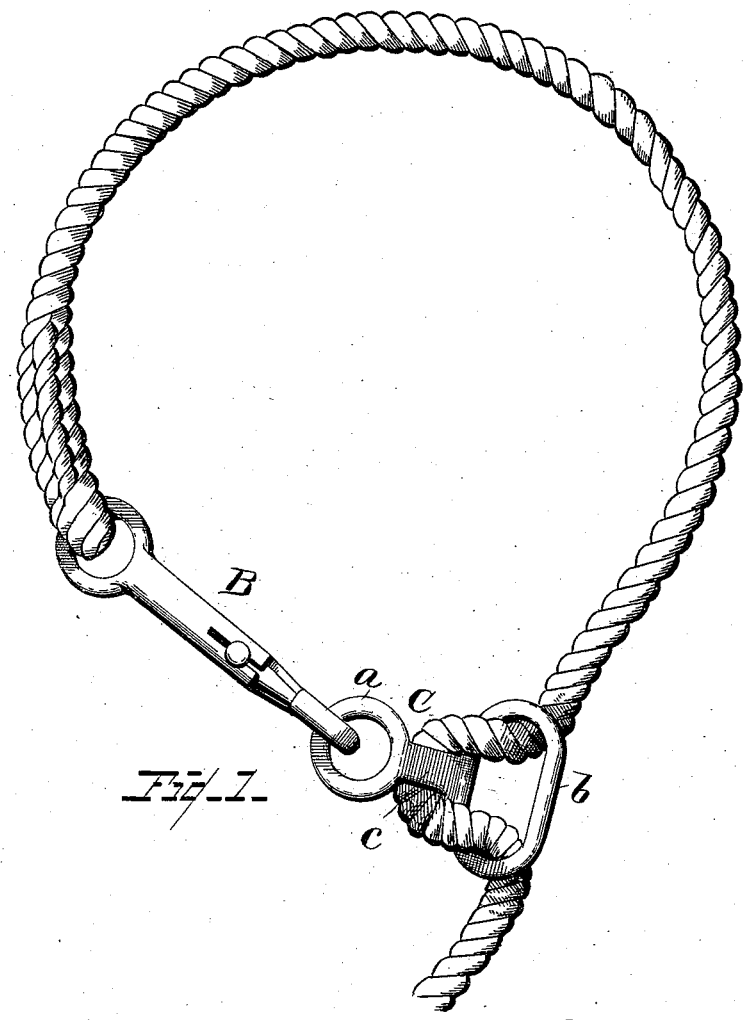
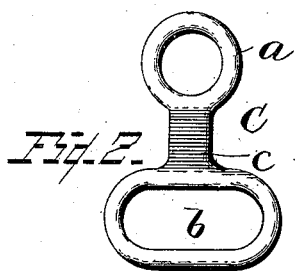
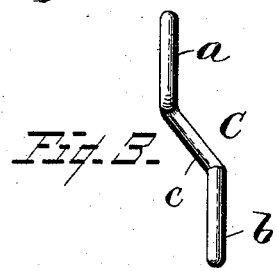
Witnesses
Albert Speiden.
A. L. Hough
Inventors
Julius C. Young & Fred C. Maranville
By their Attorney
Franklin H. Hough

UNITED STATES PATENT OFFICE.

JULIUS C. YOUNG AND FRED. C. MARANVILLE, OF ALEXANDRIA, OHIO.

HITCHING-STRAP.

SPECIFICATION forming part of Letters Patent No. 456,210, dated July 21, 1891.

Application filed March 4, 1891. Serial No. 383,807. (No model.)

*To all whom it may concern:*

Be it known that we, JULIUS C. YOUNG and FRED. C. MARANVILLE, of Alexandria, in the county of Licking and State of Ohio, have invented a new and Adjustable Cattle-Tie Loop, of which the following is a specification.

Our invention relates to improvements in manufacture of cattle-ties.

This invention relates to certain new and useful improvements in hitching-straps; and it has for its objects, among others, to provide an improved, simple, cheap, durable, and efficient loop for hitching-straps, by which the strap or rope can be readily adjusted to any desired size, and which will be firmly held in any of its adjusted positions in such a manner that it can be readily changed when desired without disengagement of its end. We provide one end of the rope with a snap hook or catch of any known or approved construction, and the loop is designed to be engaged with the snap hook or catch, and is formed with an elongated loop, through which the rope passes, the portion connecting the two end loops being designed to have the rope passed under it to increase the frictional hold thereof.

Other objects and advantages of the invention will hereinafter appear, and the novel features thereof will be specifically defined by the appended claims.

The invention is clearly illustrated in the accompanying drawings, which, with the letters of reference marked thereon, form a part of this specification, and in which—

Figure 1 is a perspective view of a hitching-strap provided with our improvement. Fig. 2 is a plan view of the loop detached. Fig. 3 is an edge view of Fig. 2.

Like letters of reference indicate like parts throughout the several views in which they occur.

Referring now to the details of the drawings by letter, A designates a strap or rope, to one end of which is connected in any suitable manner a snap hook or catch B of any suitable or desired construction.

C designates our improved loop, which comprises in a single piece the loop or ring $a$ at one end and the elongated loop $b$ at the other, the length of the elongated loop being arranged at right angles to the length of the snap-hook, as shown in Fig. 1, and a connecting-piece $c$ connecting the two loops, as shown best in Figs. 2 and 3. This connecting-piece is arranged at an angle to the two loops to form a sort of seat for the rope, which is arranged as shown in Fig. 1, one end thereof being passed through the elongated loop, thence under the connecting-piece $c$, and then passed back through the elongated loop, the two portions of the rope being upon opposite sides of the said connecting-piece, as shown. By this construction the rope can be quickly and easily applied and adjusted, and will be securely held in any and all of its adjusted positions by frictional contact with the walls of the elongated loop and the connecting-piece. By loosening the free or last portion of the rope passed through the loop the rope can be readily adjusted and again tightened without disengaging the parts.

It is deemed important that the connecting-piece $c$ be arranged at an angle or obliquely, as shown in Fig. 3, so that the loops $a$ and $b$ will stand in different planes, as seen in Fig. 3, whereby the rope will be thrown outward, where it will not come in contact with the animal.

What we claim as new is—

A hitching-strap consisting of the rope, the snap-hook secured to one end thereof, and the loop formed with loop at one end, an elongated loop at the other, the two loops being in parallel planes, and an integral connecting-piece arranged obliquely to the loops, the rope being passed through the elongated loop under the connecting-piece, and thence back through the elongated loop upon the opposite side of the connecting-piece, substantially as shown and described.

JULIUS C. YOUNG.
FRED. C. MARANVILLE.

Witnesses:
JAMES R. LADD,
J. E. YOUNG.